Feb. 24, 1931.   A. MOORE   1,793,554
APPARATUS FOR CONTROL OF COMBUSTION IN INTERNAL COMBUSTION ENGINES
Original Filed July 23, 1927   9 Sheets-Sheet 8

Engine Fan 
Hot Exhaust Gas 
Cold Exhaust Gas 
Hot Air 
Cold Air 
Fuel Continued Flow 
Fuel Slug Feed 
Metering Provision (Large) 
Reduced Metering Ports 
Engine Throttle Closed (Turns)) 
Engine Throttle Open 
Injector Metering Relative Depression of Intake 
Relative Kinetic Energy of Exhaust Gases Fig. 19.   STARTING

Fig. 20.   IDLING

INVENTOR
Arlington Moore
BY
Dyke & Schauer
ATTORNEYS.

Patented Feb. 24, 1931

1,793,554

UNITED STATES PATENT OFFICE

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE

APPARATUS FOR CONTROL OF COMBUSTION IN INTERNAL-COMBUSTION ENGINES

Application filed July 23, 1927, Serial No. 207,938. Renewed June 25, 1930.

The object of the invention is the provision of combustion control apparatus for securing improved combustion and control of combustion in internal combustion engines.

Another object consists in the provision of apparatus specially adapted for accessory installation.

With apparatus in accordnace with my invention, the principal supply of air and fuel is obtained as usual through the carburetor by passing the air through a Venturi tube or the like and utilizing velocity energy of the air for lifting or picking up fuel from a main fuel jet. This customary air and fuel mixture is throttled to control the power output of the engine, also in the customary way. This principal air supply is best cold, i. e. atmospheric air, as in this way the greatest weight of air for a given throttle opening is obtained. With use of gasoline or similar liquid fuels such a fuel and air stream is wet.

After this stream has passed the throttle and is in the intake conduit on its way to the engine cylinders, I strike it with a stream of exhaust gas and air at temperatures which are higher at part loads and lower at full loads and moving in the same direction as, and so brought together with, the fuel and air stream as to produce violent agitation and substantially homogeneous admixture of all parts of the combined streams.

Throughout the lighter load range of engine operation, the partial vacuum in the intake passage is relatively high, and at such times the supply of exhaust gas and air is accomplished by opening up ports for their admission in suitable quantities. At such times the air supplied with the exhaust gas is preheated and the heat of the exhaust gas and of the preheated air supplied therewith vaporizes the fuel and further raises the charge temperature materially, but not to a point which would cause cracking by exceeding the cracking temperature of any of the fuel constituents. The exhaust gas raises the intake manifold pressure thereby increasing the initial pressure and compression pressure, and its influence on flame propagation is such as to increase the mean effective pressure on the power stroke.

At and toward full power operation, the conditions that must be met are very different. The vacuum in the intake is low, and the differential between intake and atmospheric pressures relied on at low throttle openings to bring in air with the exhaust gas is no longer effective for this purpose. The pressure on the exhaust gas at such times is at or near its maximum, but, while the exhaust gas supplied should be sufficient to suppress detonation in the case of an engine subject to detonation, the quantity of exhaust gas that can be supplied to the cylinders is limited in that too much will dilute the charge and cause a falling off in power. Also any material excess supply of heat will reduce power by reducing charge density. At such times I utilize the relatively considerable pressure and kinetic energy of the limited quantity of exhaust gas admissible for injecting air in the relatively large quantities which can be advantageously utilized, and by using cold air for this purpose and limiting the quantity of exhaust gas as stated I am enabled to suppress detonation and to keep the temperature down to such an extent that a charge is gotten into the cylinders productive of full power.

In accordance with another feature of the invention, I supply fuel with the mixture of exhaust gas and air at certain times when required in the operation of the engine. The present case is directed to the apparatus, and particularly to apparatus which can be installed as accessory equipment, process not being claimed herein because same can be carried out with a variety of apparatus constructions which may be inbuilt as well as being capable of installation as accessory equipment.

The invention will be best understood from the following description of illustrative embodiments thereof shown in the accompanying drawings, in which:

Figs. 3, 4 and 5 are sectional views showing alternative arrangements for making connection to and taking exhaust gas from the exhaust manifold of the engine, and which are adapted to be used in making accessory installations.

Figs. 6 and 7 show an alternative arrangement for establishing communication between the control apparatus and the intake manifold of the engine.

Figs. 11-14 illustrate an auxiliary fuel feeding apparatus, of which

Reference character 10 designates the intake manifold, and 12 the exhaust manifold of a multi-cylinder internal combustion engine making use of so-called volatile liquid fuel, as gasoline, for example. The cylinders, pistons, and so forth, being well understood, are omitted from Fig. 1, showing the engine manifolds.

The carburetor 14 shown is of the simple plain tube type. The air is admitted through the Venturi passage 16 surrounding the fuel jet 18. Thus Venturi passage, it should be noted, is of enlarged cross-section, as compared with ordinary practice not involving use of my process for combustion control, it being a desideratum to obtain the greatest possible supply of air in cylinder charges. Jet 18 is in communication with the constant level, air-vented float chamber 20. The throttle 22 is shown as being included in the carburetor casing.

If, in making an accessory installation, the carburetor already in use is to be retained and contains such things as idling and compensating fuel jets and the like, they are preferably closed off, these functions being taken care of through the accessory combustion control apparatus, thus making it unnecessary to adapt the apparatus for combustion control, installed as an accessory, to the various sorts of provision for supplying fuel for idling, compensating, and so forth, made use of in various makes of carburetors.

Figures 1, 1A:
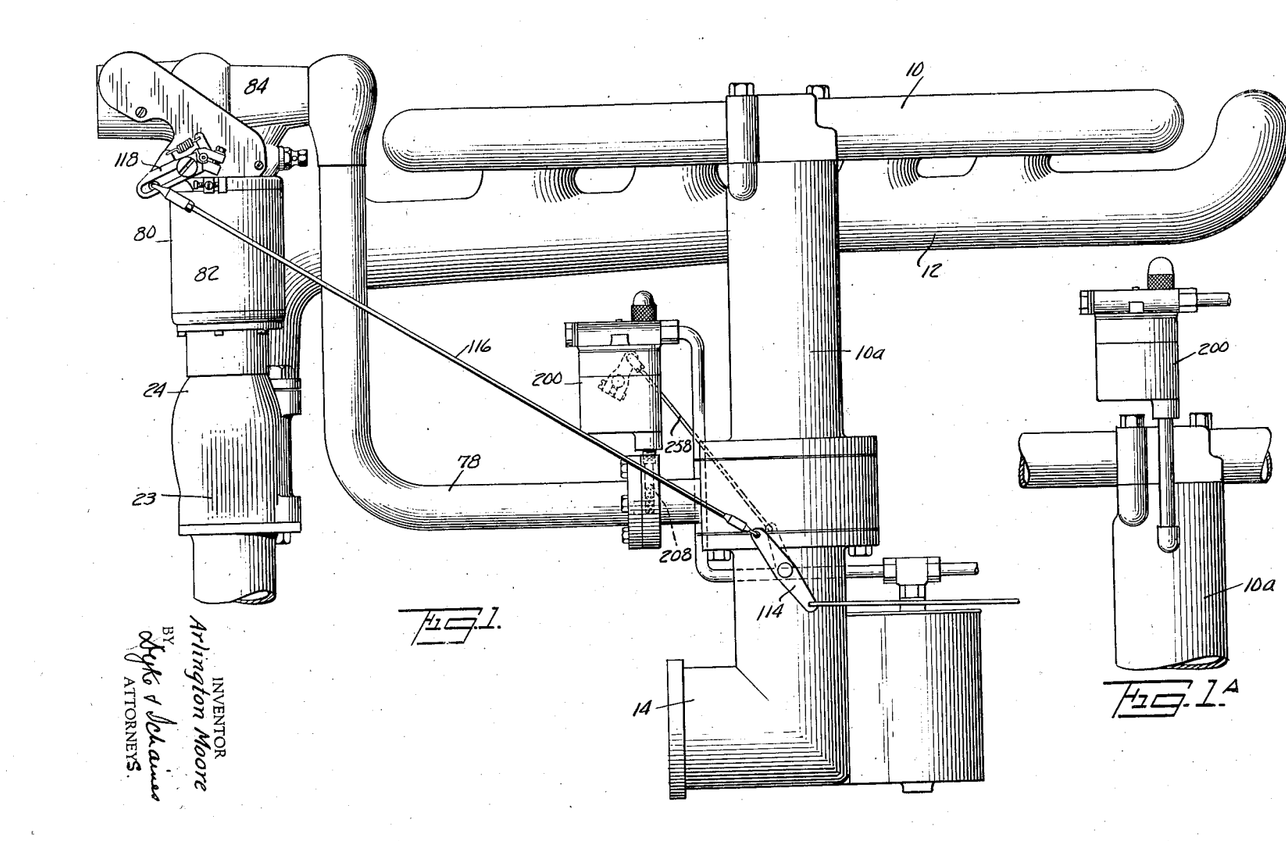
Fig. 1 is a side view of the manifold system of an internal combustion engine provided with apparatus for combustion control adapted to be applied as accessory equipment. The engine cylinders and related parts of well understood construction are omitted from the figure.
Fig. 1a is a side view of a modification.
Figure 2:
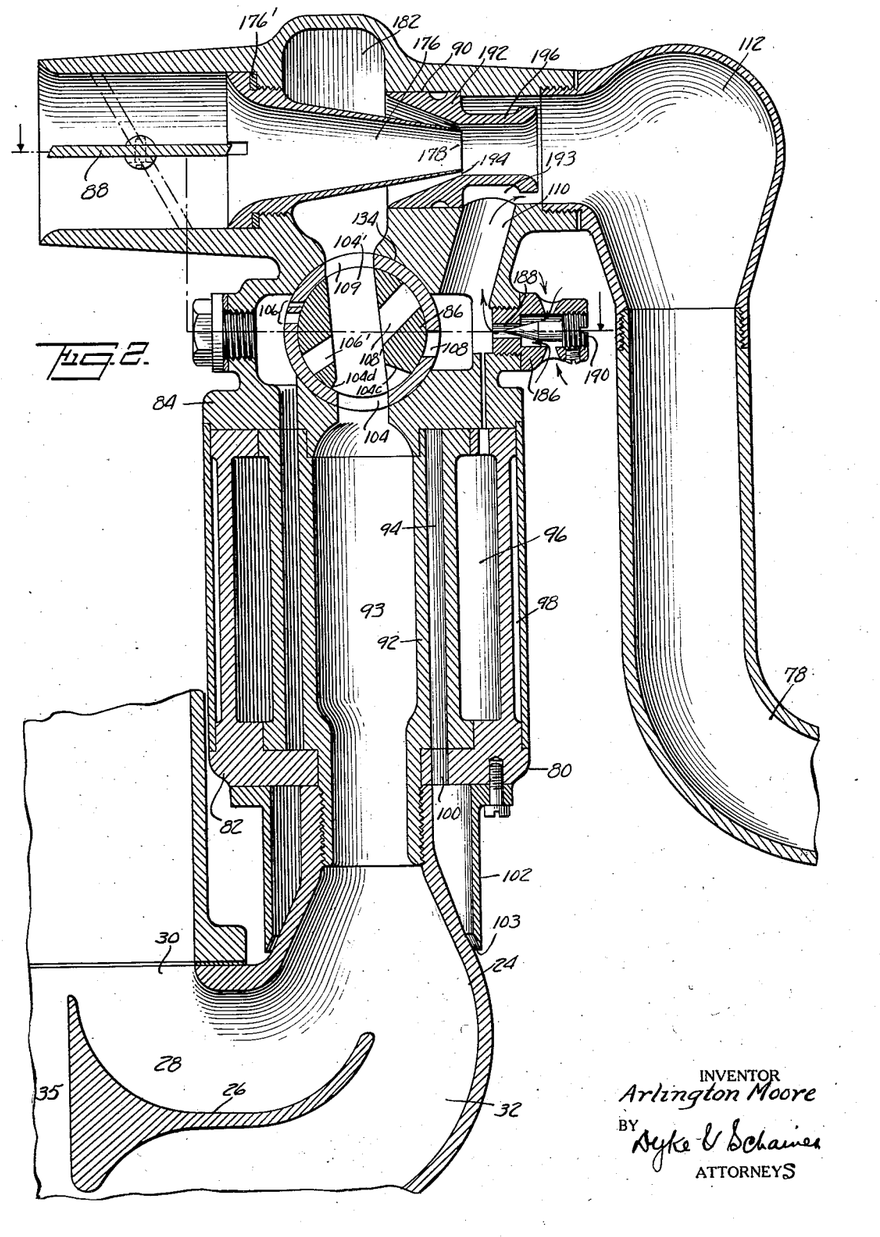
Figs. 2 and 2a, taken together, show the accessory apparatus for combustion control in section as connected to the engine manifolds.
Figure 2A:
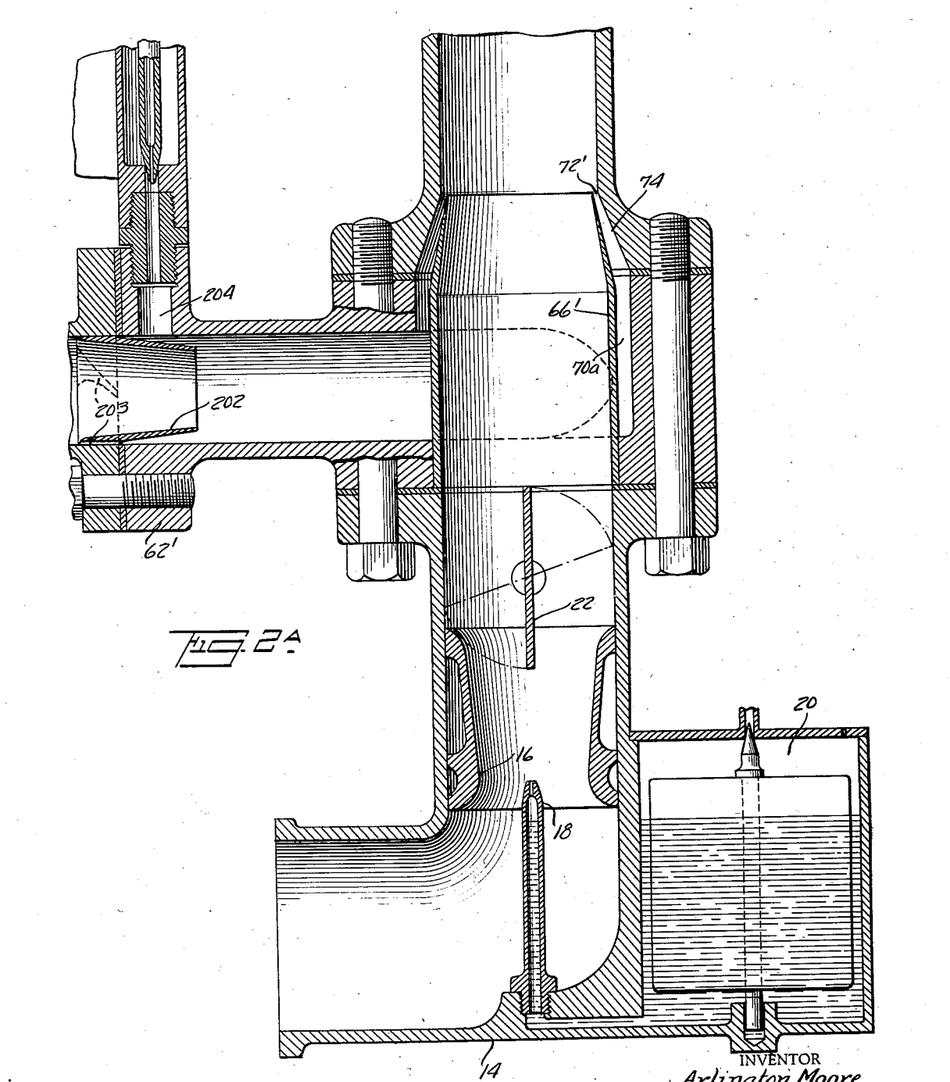

Figs. 1, 2 and 2a show my combustion control apparatus installed as an accessory on an engine so constructed that it is possible to connect the delivery end of the combustion control apparatus to the intake between the carburetor containing the throttle and the intake conduit, and to connect to the exhaust pipe by replacing a part of the exhaust conduit with a means for diverting a portion of the exhaust gases.

The means provided for the latter purpose, in making an accessory installation may take a number of forms, depending principally on the particular engine and exhaust conduit and connections. That shown in Figs. 1, 2 and 2a includes an inserted exhaust conduit section 23 with a laterally and upwardly extended taper neck 24, and having a concaved septum 26 extending approximately half-way across the exhaust conduit, thus leaving substantially one-half of the exhaust conduit fully open as usual, and providing a passage 28 in the other half of the exhaust conduit having its mouth 30 directed against the flow of gases in the exhaust conduit 12. The passage 28 directs exhaust gas into the taper neck member 24, from which it is delivered in greater or lesser quantities to the combustion control apparatus, and the septum 26 is so arranged as to permit excess gases to pass around and back into the exhaust conduit through the return relief passage 32, thus insuring ample delivery of heat to the combustion control apparatus and avoiding the building up of material back-pressure when the exhaust gas port is not open or only partly open.

Figure 3:
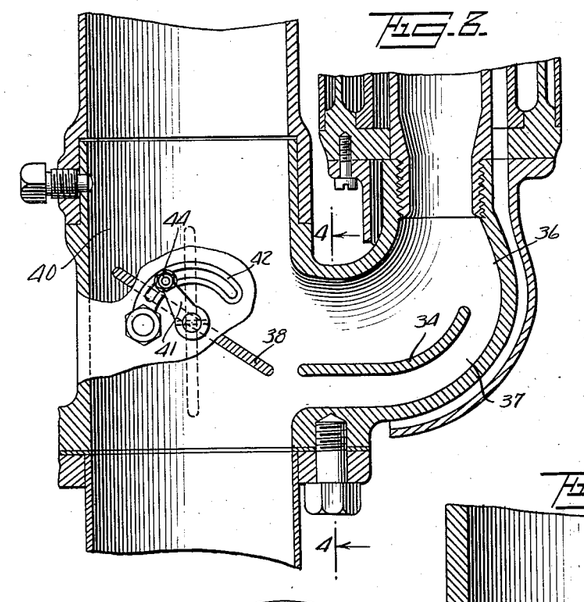
Figure 4:
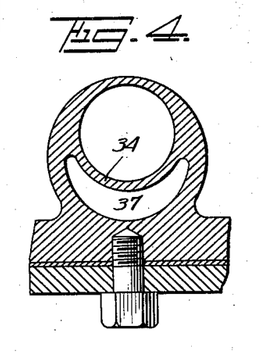
Fig. 4 is a section on the line 4—4 Fig. 3.

A form of eduction tube, generally similar to that just described, is shown in Fig. 3. In this case, a septum or partial partition 34 in the taper neck outlet tube portion 36 provides a return passage 37 around it, as before, and a butterfly valve 38 is provided in the tubular member 40 inserted in the exhaust gas conduit for diverting the exhaust gas and passing it on to septum 34. This butterfly valve 38 is adjustable by means of a crank 41 secured to its projecting shaft and adapted to be clamped to a lock arm 42 by a lock nut 44. Thus the quantity of exhaust gas diverted can be regulated for winter and summer operation, hot and cold climates, etc.

Figure 5:
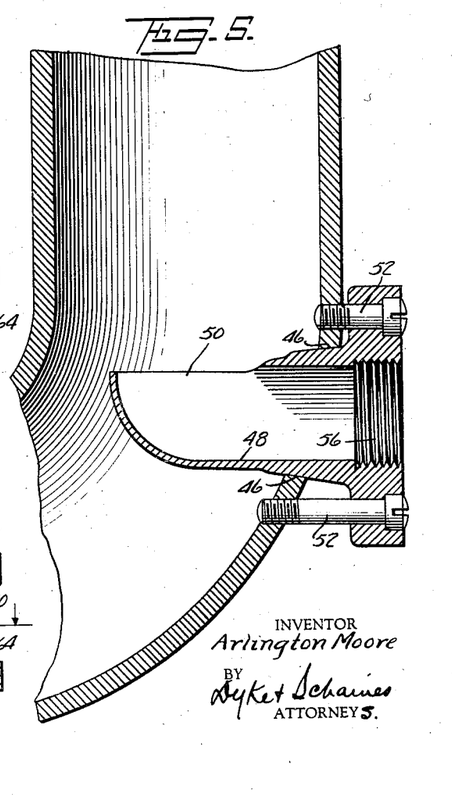

When it is not feasible to replace a part of the exhaust conduit with a special fitting, a taper hole 46, Fig. 5, can be made in the conduit wall, and an impact tube 48 inserted with its mouth 50 directed against the flow in the conduit. Member 48 can be securely fastened in place by screws 52 with its taper neck fitting closely in the taper bore. In the form shown, the impact tube member 48 has a screw threaded portion 56 for securing the stove or heater and said stove or heater and connected parts are extended substantially horizontally instead of vertically, as in Figs. 1, 2 and 2a. Other forms of exhaust gas diverting means can be used, but those shown are sufficient for taking care of connecting apparatus in all ordinary cases where it is to be installed as an accessory.

Figure 6:
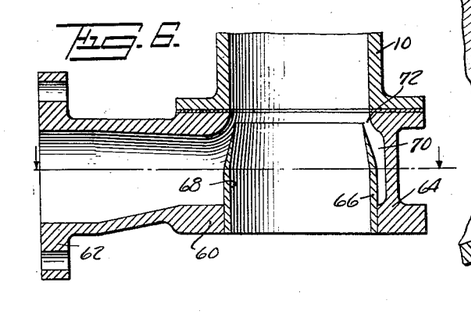
Fig. 6 is a vertical sectional view on the line 6—6, Fig. 7
Figure 7:
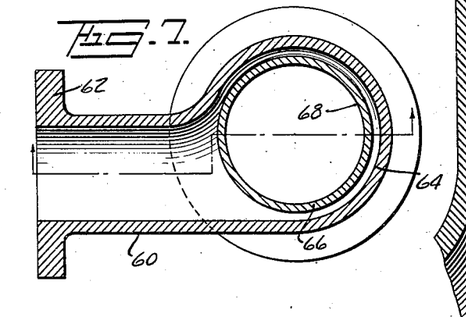
Fig. 7 is a horizontal sectional view on the line 7—7, Fig. 6.

Two forms of delivery means for injecting the exhaust gas and air mixture into the intake conduit, and adapted for accessory installation, are shown in Fig. 2a and Figs. 6 and 7 respectively.

That shown in vertical section in Fig. 6 and in horizontal section in Fig. 7 is adapted for connection between the carburetor and the intake conduit where the bores of each of these are alike and consists of a tubular member 60 having a flange pipe connection 62 at one end, and formed at the other end with an offset chambered part 64 which receives a preferably thin tube 66, the bore 68 whereof is adapted to line up with the bore of the intake conduit, and which tube 66 is surrounded by the annular passage 70, through the relatively narrowed and inwardly inclined annular mouth 72 of which the gases of the combustion control apparatus are discharged along spiral or whirling lines to join and become thoroughly admixed with the fuel and air stream going to the engine cylinders from the carburetor. Such spiral or whirling movement can be obtained in various ways, but in the construction shown, this result is obtained by offsetting the tubular member 60 to substantially one side of the chamber 64, so that the delivery of gases thereto is substantially tangential to one side of the annular chamber passage 70, as will be apparent from the showing in Fig. 7.

Where there is more room and the intake conduit has a tapered mouth, as shown in Fig. 2a, a thin tubular member 66' may be provided, of elongated formation, and the mouth 72' of the annular passage directed inwardly on a sharper incline or taper, so as to secure a more effective swirling admixture of the charge constituents. The elongated tube 66' is preferable because it permits a somewhat more extensive heat delivery through the tube walls to the fuel and air mixture from the carburetor prior to the admixture of the additional gaseous material therewith at the region of the annular delivery passage 72'.

While other forms of delivery connection to the intake conduit can be made, it will be plain that the two forms shown are sufficient to obtain practical and efficient attachment and delivery in making up any ordinary accessory installation, and do not obstruct the flow of the fuel and air mixture from the carburetor.

The exhaust gas eduction device connected to the exhaust conduit and the delivery means connected to the intake conduit form the two opposite ends of a by-pass from exhaust to intake of an internal combustion engine.

The by-pass is to some extent formed of pipe and fittings, such as shown at 78, Fig. 1, but is desirably enlarged in part to form a casing 80, and the control apparatus concentrated in this enlarged part or casing 80, which is preferably supported on or located close to the exhaust conduit and has the pipe connections reaching from it to the intake conduit.

The control apparatus located in such casing part 80 of the by-pass serves for regulating and determining the nature and state of the additions made to the fuel and air stream from the carburetor through the by-pass including such enlarged or casing part 80 thereof.

These control functions include the metering of hot exhaust gas and the admission, heating and metering of hot air at partial throttle openings; and at and toward full engine loads include the metering of exhaust gas, the admission and metering of cold air, and the injection of cold air and reduction of temperature of the exhaust gas.

Casing 80 is made in two principal parts 82 and 84 to permit construction in such manner as to conveniently serve its several functions.

Part 82 contains the exhaust gas stove and air heating passages, and part 84 the exhaust gas and hot air metering rotor 86, cold air inlet valve 88, and the injector indicated generally by reference character 90. The exhaust gas eduction means, as 23, serves to support casing part 82 on the exhaust conduit, and part 84 of casing 80 is connected by the piping 78 to the delivery device, as 64, and the intake conduit.

The exhaust gas eduction member, as 23, for example, has a chambered heater 92 screwed into its mouth. Heater 92 is surrounded by an air passage 94, through which air is passed for preheating. The casing part 82 containing passage 94 and stove 92 may contain heat insulating chambers surrounding air passage 94, as indicated at 96, 98. Air is admitted to passage 94 at 100 after first being warmed by passing through the shell 102, which it enters at the mouth 103.

Exhaust gas passing through the chamber 93 of stove 92 is delivered by port 104, and the preheated air passing through passage 94 by port 106 to the metering rotor 86, in which they are admixed, and pass out through port 108 and passage 110 to the preferably substantially spherical mixing chamber 112 and thence through pipe 78 and annular delivery passage, as 72, 72', into the intake conduit, the passages 104', 106' and 108' of rotor 86 coacting with ports 104, 106 and 108 respectively.

For operating the rotor 86, the throttle crank 114 is adjustably connected by rod or link 116 to the slotted plate 118 pivoted at 120 to the crank 122, which is clamped to the projecting shaft 124 of rotor 86 by the clamp 126.

A stop piece 128 of plate 118 engages shaft 124, and spring 130 connects plate 118 to angle arm 132 of crank 122. In this way, the rotor 86 turns with the throttle, but if rotor 86 should be held from moving by any cause, the spring 130 will yield and permit the throttle to turn substantially as usual.

Figures 8, 10:
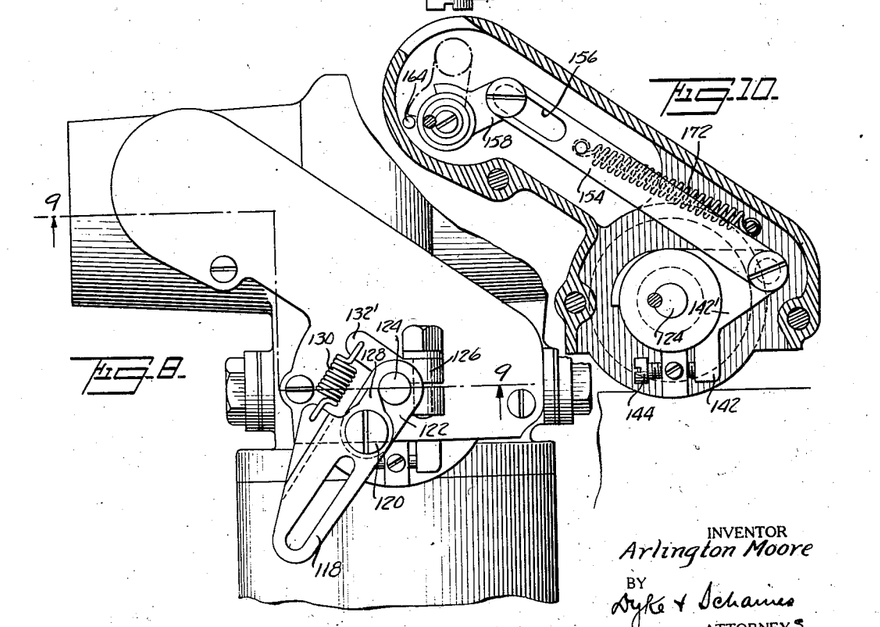
Fig. 8 is a side elevational view of metering apparatus for metering exhaust gas and air.
Fig. 10 is a section on line 10—10, Fig. 9.

The rotor 86 turns in the ported sleeve 134, being mounted on ball bearings 136, 136 and being sealed against leakage by cap 138 covering the end thereof remote from operating crank 122, and also being supplied with a coil return spring 140 for restoring the rotor 86 to closed position with the arm 142 of a second rotor crank 142' in contact with the adjustable stop screw 144, Fig. 10. The sleeve 134 is removable with the entire meter assembly by unscrewing screws 146, 146 and taking off the cover plate 148.

Figure 9:
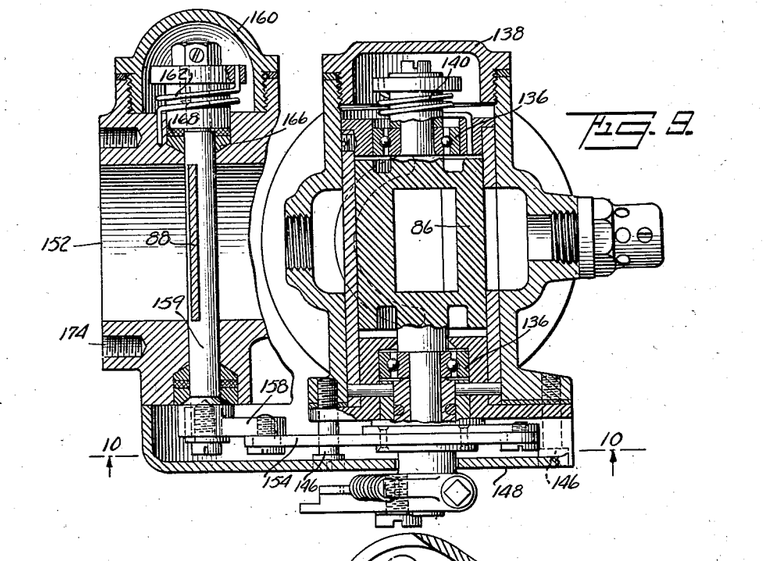
Fig. 9 is a view taken partly in section on the line 9—9, Fig. 8.
Figure 11:
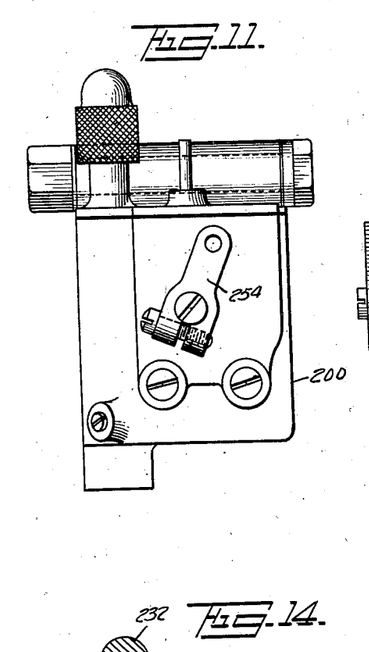
Fig. 11 is a side view, Fig. 12 a plan view, Fig. 13 a section on line 13—13, Fig. 12.
Figure 12:
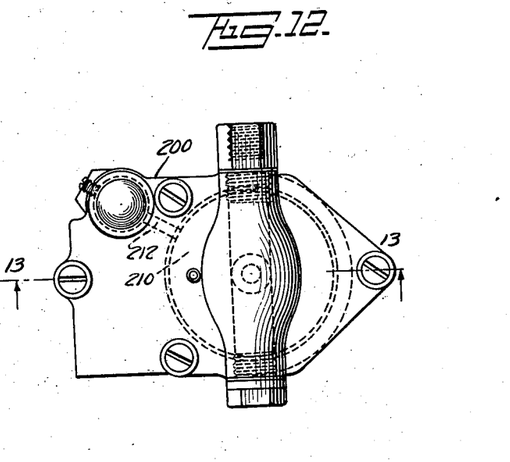
Figure 13:
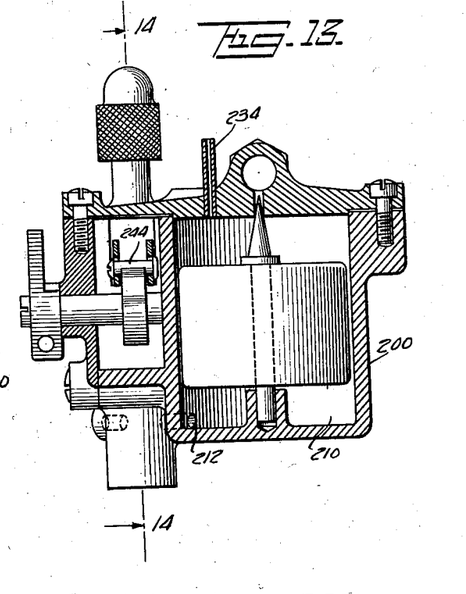

The butterfly valve 88, controlling the extent of opening of the cold air inlet 152, is operated from meter rotor 86 by a lost motion connection including the slotted link 154 pivoted to crank arm 142' on the shaft of rotor 86, and having a lost motion connection by means of the elongated slot 156 to crank 158 of the butterfly cold air valve 88. This connection may be adjustable if desired, as by varying length of the slot 156. The remote end of the shaft 159 of valve 88 is enclosed in a leak-proof cap 160, and a spring 162 is provided for holding the cold air butterfly valve 88 in normally closed position, in which position valve 88 is its own stop. A stop 164 is provided to prevent opening movement of valve 88 beyond the wide open position, as shown in full lines in Fig. 2. Conical washers 166 and leak-proof bushings 168 are provided to prevent leaks around shaft 159 of the valve 150. The slotted link 154 is retracted by the expansion spring 172. With the provision of spring 172, the helical spring 140 may be dispensed with, if desired. A cover plate 148 is provided to enclose the parts just described, and same is removable with the sleeve 134, as above described. Screw holes 174, Fig. 9, are provided to connect an air scoop to the cold air inlet 152, to be exposed in the path of moving air, as the blast from the fan of an automobile engine, for example, in order to collect and drive cold air into such inlet 152.

The cold air which passes butterfly valve 88 goes through the nozzle 176 of the injector 90, around which nozzle exhaust gas sweeps through the annular passage 194, thereby producing an effective injection of the cold air by the exhaust gas.

Figures 15, 16, 17, 18:
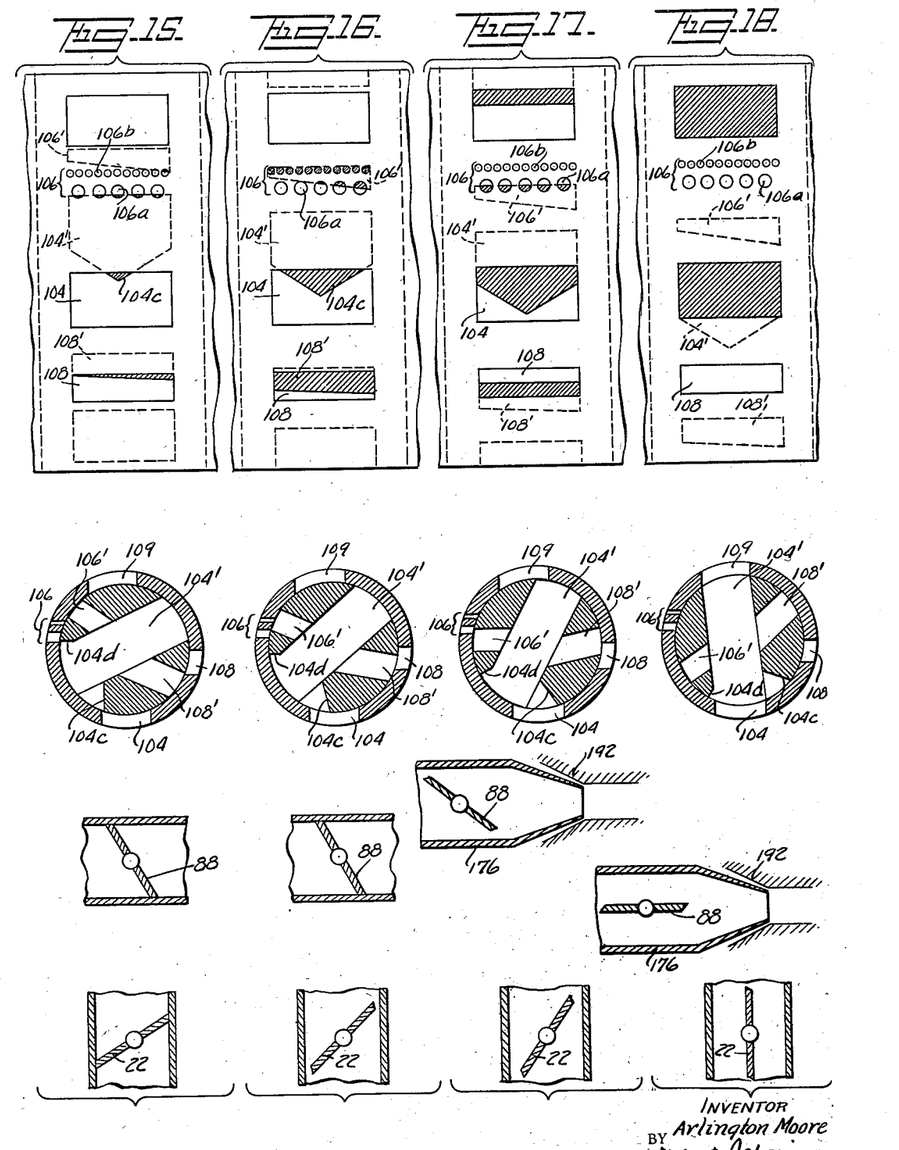
Figs. 15-18 illustrate successive sets of positions of the rotary metering mechanism for metering hot air and exhaust gas and shown in unrolled diagrammatical form and also in section, the cold air injector and inlet valve and the engine throttle, respectively.

The operation of the metering rotor 86 is shown in Figs. 15–18, the upper part of each of these views being an unrolled showing of the relation of the sleeve and rotor ports, with the registering portions indicated by cross hatching or section lines. Fig. 15 shows the position for engine idling and the following views show positions through part power and up to full power. Rotor ports are shown in dotted and sleeve ports in full lines. For idling, the rear edge of the rotor exhaust gas port 104' is in register with the forward edge of the row of holes 106 constituting a part of the hot air sleeve port 106, (the remaining part of said port 106 being made up of the row of smaller holes 106b) and the said rotor port 104' is also in register at its narrowed or pointed advance side 104c with the exhaust gas sleeve port 104. Thus, at idling both hot air from sleeve hot air port 106 and hot exhaust gas from sleeve exhaust gas port 104 pass together through the meter port 104' intended primarily for passage of exhaust gas, and are mixed in passing through the rotor 86 and pass out by passage 110 through sleeve port 108 and rotor port 108' which are in register to a partial extent, as shown in Fig. 15. Port 108' preferably has an inclined or cleaver forward edge, as shown, in order to come into registration gradually, and the same is true of port 106'.

It will be seen that upon further turning of the rotor 86, sleeve hot air port 106 registers with rotor port 106', and the exhaust gas ports 104 and 104' are separately in register. The reason for sending hot air for idling in at one side of port 104' and exhaust gas at the other side of the same port is that, at least in accessory installations, and particularly with the use of a main air Venturi passage made larger than is customary with usual carburetor practice, regard must be had for the fact that, upon the first opening up of the throttle, the air velocity past the main jet is relatively low with consequent restriction of its capacity for fuel lifting, and a "flat spot" is commonly encountered, that is to say, the mixture of air and fuel supplied through the carburetor will be unduly lean. By putting the hot air for idling in through the back of the rotor exhaust gas port, the hot air passage is partially shut off or reduced upon a slight forward turning movement of the rotor, and between the closing off of air supply through the back of the rotor exhaust gas port and the opening up for hot air by ports 106 and 106' coming into registration, I am enabled to take care of such "flat spot" conditions encountered when the throttle is first opened up after running the engine idly on closed throttle, and to ensure that same will not be exaggerated or aggravated by supplying much hot air through the rotor as the throttle is just being opened up. Thus in a simple way and with all forward movement of the rotor, without resort to forward and back movement or the like, I am enabled to meter, first, enough hot air for idling the engine, then less hot air, and later more hot air.

It will be seen by tracing the port registrations across Figs. 15–18 that, as the throttle 22 is opened, hot air ports 106 and 106' first gradually come into register, and then gradually close upon further opening of the throttle, and the same is true of ports 108, 108' for delivering a mixture of hot air and hot exhaust gas to the engine intake.

As ports 106 and 108 begin to close, the meter exhaust gas port 104' comes into register with the sleeve port 109 opposite sleeve port 104, thus delivering exhaust gas to the chamber 182 surrounding cold air nozzle 176, and the cold air valve 88 "cuts in" or begins to open. As will be seen from Figs. 2 and 18, when the throttle 22 and cold air valve 88 are wide open, there is a clean, smooth passage open for exhaust gas through the exhaust gas meter port 104' and by making the rotor 86 substantially solid, with minimum removal of metal for the formation of passages 104', 106' and 108', there is substantially none of the eddying and consequent interference with continuous, smooth exhaust gas travel, which is unavoidable when the rotor is made by cutting ports in a bored out or tubular member. The advance side of rotor port 104' is preferably made of substantially V-shape to obtain a gradual opening up, as indicated at 104c, and its rear edge cut back as indicated at 104d to obtain initial registration with a part of hot air port 106, as already described.

I may provide an auxiliary air inlet opening into passage 110, by inserting a plug 186 containing a passage 188 controlled by adjustment of the needle pointed screw 190 for final regulation of the air admitted through conduit 78. This feature may be dispensed with, when exactly the right relation is obtained between the hot air and the hot exhaust gas admitted through the rotor, but this is ordinarily not altogether simple or easy to do, and with this extra air inlet provided, it is possible to arrange, for example, to have a slight relative excess of exhaust gas and then to bring the mixture of exhaust gas and hot air back to the right proportions by a slight opening up of passage 188. When this is not wanted, the screw 190 can be screwed up tight, closing off the passage 188. The provision of such a bleed hole for cold air is also of utility for tempering purposes, that is to say, if the heat supply for light load operation is higher than desired, the heat can be reduced to some extent by opening up the passage 188.

The cold air aspirating nozzle 176 and the aspirating tube 192 for exhaust gas are made so as to be readily removable and replaceable when desired, and the arrangement is such that the extent of projection of the mouth of nozzle 176 into the aspirator tube 192 can be varied at will. In the construction shown, the nozzle 176 can be screwed out after first removing the cold air valve 88, and either replaced by another of different dimensions, or thicker or thinner gaskets 176' inserted, thus controlling the extent of projection of the mouth of nozzle 176 and the amount of opening of the annular passage 194 for exhaust gas therearound, or the aspirator tube 192 can be taken out and replaced by another one of the desired dimensions. The passage 110 for delivery of hot exhaust gas admixed with hot air preferably has its outlet to the mixing chamber 112 in the lower side of the annular passage 193 left open around the tubular part 196 of the aspirator tube 192, and when the mixture of gases coming from passage 110 issues into chamber 112 from around the end of aspirator tube 192, same is already well admixed and in substantially homogeneous state.

It will be seen that with the aspirator construction shown, comprising the exhaust gas chamber 182 of ample dimension surrounding the cold air nozzle 176 and discharging freely with the entire pressure of the exhaust conduit behind it through the annular passage 194, a very efficient aspiration of cold air by exhaust gas is obtained. The exhaust gas at aspirator passage 194 is at substantially its maximum temperature, and the cold air delivered at the mouth 178 of nozzle 176 is substantially at atmospheric temperature, there being substantially no opportunity prior to their coming into admixture with one another at the aspirator passage for prior interchange of heat. The cold air passage 178 is considerably larger than the passage 194 for exhaust gas, this passage for exhaust gas being of limited section, so that it will not pass sufficient exhaust gas to lose power by undue dilution of the charge at full load.

When the exhaust gas at a temperature of several hundred degrees is brought into admixture with the cold air at the mouths of the aspirating passages, the resulting mixture is at a temperature much below the temperature of the exhaust gas supplied, and the resulting shrinkage contributes to obtaining a very effective aspiration of cold air. The temperature of the combined gases issuing from the aspirator to the mixing chamber 112 is as a rule considerably under the temperature required for condensation of $H_2O$ vapor always present in relatively large quantities in the exhaust gas and, without being committed to a particular theory, I consider that such condensation contributes to the very highly effective aspiration of cold air that is obtained.

The cooling of the exhaust gas by direct admixture therewith of cold air and by the aspirating action is sufficient, without resorting to cooling by heat radiating fins or the like, for bringing the mixture of exhaust gas and cold air down to a temperature such that when admixed with the fuel and air mixture from the carburetor, the resulting final charge sent to the engine cylinders does not have its temperature materially raised and is not rarified, but a heavy, dense charge is supplied and full volumetric efficiency obtained.

It will be noted that the passages are all either direct or of easy sweeping character, so that the gases can pass through with minimum friction loss. It should be observed that while the air valve 88 serves to meter the cold air at its first or partial openings, when valve 88 is fully or practically fully opened, the metering function is taken over by the air nozzle 176, the mouth 178 whereof is made much smaller than the valve 88, and cold air inlet 152 leading to valve 86. The exhaust gas passage aspirator 194, which surrounds the mouth 178 of aspirator air nozzle 176 is also considerably smaller than the full opening of exhaust gas port 104 and similarly serves a metering function. In this way, with the full pressure and kinetic energy of exhaust gas and cold air available at the aspirator nozzles, it becomes possible to secure velocities at the apirator nozzles which will produce a supply of cold air of ample quantity, while at the same time the exhaust gas quantity is not so great as to cause undue charge dilution and consequent loss of power.

By supplying both air and exhaust gas to the intake through the annular delivery passage 72 or 72′, this passage can be made of fairly generous area and is not likely to be clogged up by foreign particles becoming lodged, as may be the case with excessively narrow passages. Aspiration is obtained to some extent at this point, supplementing the action of aspirator 90.

Figures 19, 20:
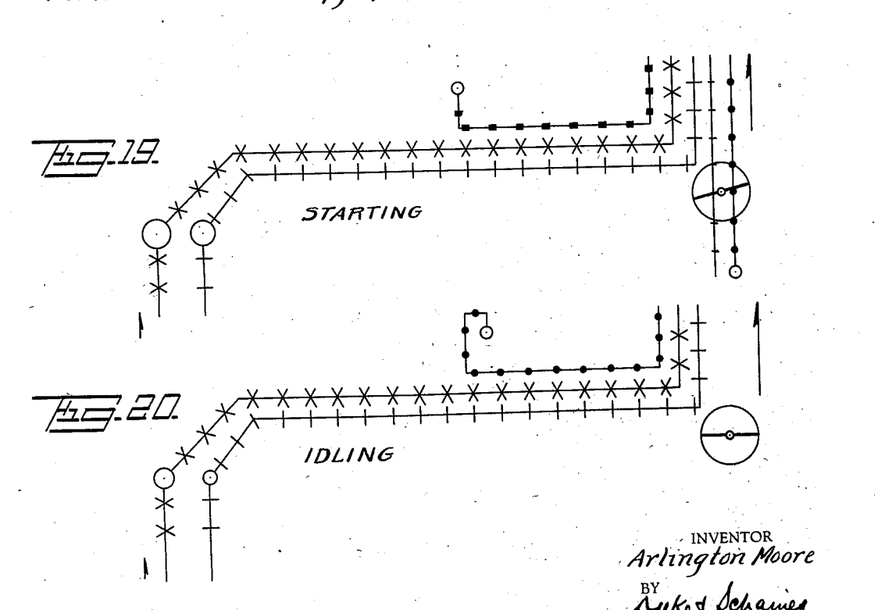
Figs. 19-27 are diagrammatical flow sheet views indicating the constituent elements of, and the control factors affecting, the charge mixtures at various stages of engine operation.

As has been stated, it is found desirable, at least in accessory installations, to have the supplying of fuel for idling taken over by the combustion control apparatus, since adapting the apparatus to the idling, etc. arrangements of various carburetors would be a substantially endless task. Thus, with the accessory equipment, the throttle is usually closed at idling, as indicated in Fig. 20 and the only gaseous charge materials supplied are the hot exhaust gas and hot air admitted through the combustion control apparatus.

The fuel for idling, and for other purposes which will be referred to, may be supplied into the conduit 78 from the fuel supply apparatus 200 connected to the conduit 78, as shown in Fig. 1, or this fuel supply apparatus may deliver fuel direct into the intake manifold riser 10a, as shown in Fig. 1a.

Such apparatus 200 provides all the fuel for idling and at certain other times supplies fuel as an auxiliary fuel supply along with the main supply from the caburetor jet 18.

At idling and with slightly wider throttle openings, the vacuum in the intake conduit is substantially the maximum and at such times I preferably make use of the intake vacuum for supply of fuel through the auxiliary fuel supply device 200. It is also especially desirable in automobile engines to make provision for limited or slug auxiliary fuel supply when the throttle is opened up for the purpose of getting quick acceleration. As already stated, the Venturi passage 16 at the main fuel jet is purposely made as large as practicable in order to get as much air in here as possible at full load engine operation. If the throttle is suddenly opened when the engine speed is low, the air velocity past the main fuel jet will be extremely low, with consequent reduction in the fuel lifting capacity, and of course the intake vacuum will have practically vanished with the opening up of the throttle.

Under such circumstances, and particularly in the case of automobile engines in which the necessity for quick pick-up has now become universally recognized, I have found it highly desirable to have an auxiliary fuel supply momentarily delivering fuel to carry the engine over the "flat spot," which is resultant upon such opening up of the throttle, independently of the induction ordinarily relied on for fuel lifting, but which is temporarily unavailable or at least greatly reduced, and the fuel supply apparatus 200 is designed to effect a limited gravity delivery of fuel at such times. This gravity fuel delivery is also useful in starting the engine.

When the auxiliary fuel supply device is connected in the pipe flange 62′, as shown in Fig. 2a, a cone 202 is preferably arranged under the fuel outlet 204 so that the gases sweeping through the cone 202 will effect a thorough distribution of the fuel so supplied. This distribution is especially effective when the gases coming through the conduit 78 are most highly heated. A plurality of preferably spiral passages 203 are provided between the cone 202 and the walls of conduit 78 to permit the swirling therethrough of a sufficient portion of the conduit gases to carry along the fuel as it is delivered at the fuel outlet 204. Another way of securing good distribution is by discharging to conduit 78 or intake 10a through a perforated tube 208, Fig. 1.

The fuel delivery apparatus 200 comprises a constant level fuel supply float chamber 210, communicating through passage 212 with a well 214 having a bottom outlet 216 controlled by the hollow needle valve 218, which is held down by spring 220 engaging the upper side of shoulder 222. The hollow needle valve 218 has a replaceable jet 224 in its upper end which limits the passage of fuel by induction through the needle valve. The well 214 is not vented except for an adjustable air bleed opening 226, the extent of opening whereof is controlled by a needle pointed screw 228, and the air inlet openings 230 are enclosed by a screw cap 232. The float chamber is vented at 234.

The fuel for idling is supplied by vacuum induction, the fuel being lifted in well 214 by the vacuum acting through the bore of needle valve 218, so that fuel is admitted at 224 to the bore of the hollow needle 218, which is passed to the conduit 78 or intake 10a, the air bleed opening 226 being so adjusted that when the intake vacuum is over a given amount, say eleven inches of mercury in some engines, the required quantity of fuel will be supplied through this avenue. With engine idling on fuel so supplied, the throttle is entirely closed, as in Fig. 20, and even with a partial opening of the throttle, particularly if the engine is turning over at a fair rate of speed, this supply of fuel will continue until the vacuum in the intake conduit 78 falls below that for which the air bleed opening 226 is adjusted. The fuel supplied is subdivided and aerated to some extent by the air supplied through the small bleed hole 226. The described arrangement permits the idling and compensating air to be supplied with the accessory apparatus installed for combustion control and enables the various carburetor arrangements for this purpose to be dispensed with.

Figure 14:
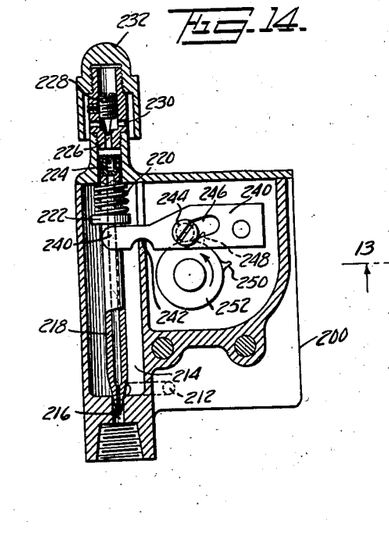
Fig. 14 is a section on line 14—14, Fig. 13.

Fuel for acceleration and starting is supplied by momentarily raising the valve 218, permitting a slug of fuel to be delivered by gravity. In the form shown, the needle valve 218 is arranged between the two side parts of lever 240 which is normally supported at 242 to extend just under the shoulder 222 of needle valve 218. Lever 240 has a roller 244 running in inclined slots 246, and when this roller is engaged by cam spurs 248, 250, on the rotary member 252 turning in the direction of the arrow on Fig. 14, the lever 240 and needle valve 218 will be momentarily raised, permitting a slug of fuel to be delivered to the intake. Return movement of rotary member 252 does not disturb needle valve 218, as the roller 244 is merely moved up in the inclined slot 246 when engaged by the spurs, without raising the lever 240.

Member 252 is actuated by a crank 254 linked to the throttle by link 258, Fig. 1. It will be seen that upon opening the throttle for accelerating, a slug of fuel will be delivered to the intake passage and when the throttle is opened widely from a substantially closed position this will occur twice at separated intervals.

The first spur 248 is also useful in starting, as by opening and closing the throttle a few times sufficient fuel is supplied for starting and for at least partially warming up the engine. Thus manipulation of the engine throttle lever or accelerator is all that is required at starting, and the common choke and flooding evils attendant upon its use are dispensed with.

The various stages of operation are indicated diagrammatically in Figs. 19-27:

At starting (Fig. 19), with the throttle opened slightly, which is all the opening required, some cold air and some fuel are taken through the carburetor, and metered quantities of hot air and hot exhaust gas are supplied through conduit 78 while the additional fuel supply is obtained in a slug or slugs through the auxiliary fuel feed 200. As has been stated, the customary choke is dispensed with.

At idling (Fig. 20) the only fuel supply is continuous flow by induction through needle valve 218, the throttle is closed, and the hot air and hot exhaust gas are metered through the combusion control apparatus.

Upon the first throttle opening beyond idling (Fig. 21), the hot air supply is reduced by the transition of the sleeve hot air port 106 from registration with the exhaust gas rotor port 104' to begin registration with hot air valve port 106', and the opening for inlet of the hot air is thereby reduced as indicated in this view. Also, the throttle being opened somewhat, air and fuel are supplied therethrough. The continuous supply of fuel through the auxiliary apparatus 200 continues, as the intake vacuum is not reduced below that which will pull fuel through the needle valve 218.

Figures 21, 22:
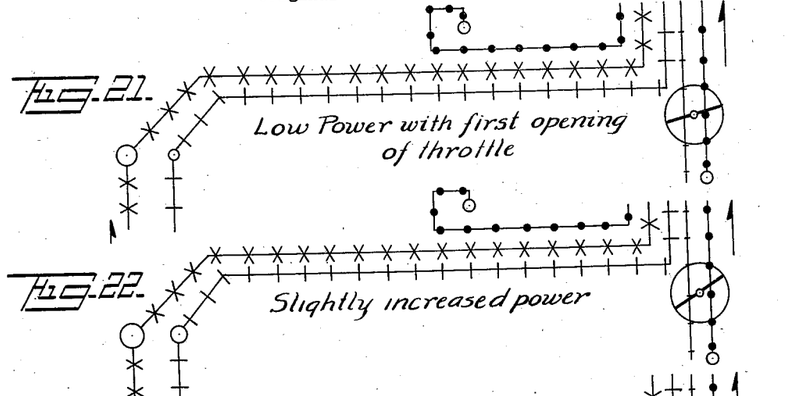

With a further throttle opening as in Fig. 22, the constriction of the hot air inlet to take care of the flat spot has been passed over and the hot air port is further opened up. The situation is otherwise as in Fig. 22.

With further power required and further throttle opening (Fig. 23), the continuous supply of fuel from the auxiliary supply device is stopped, the intake vacuum having fallen with the further opening of the throttle to a point where fuel is not drawn through the needle 218. The exhaust gas and hot air ports have opened to an additional extent.

Figures 23, 24:
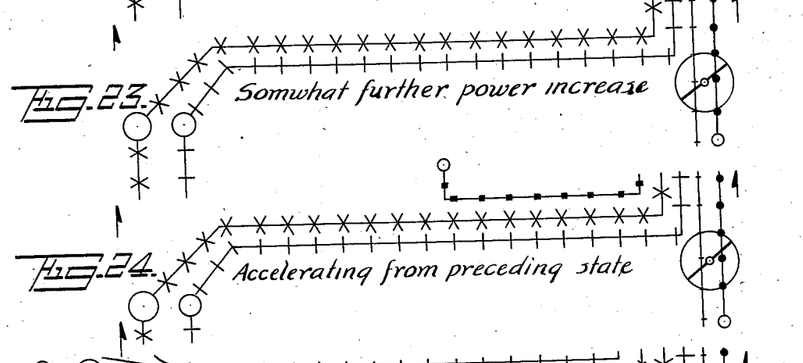

Fig. 24 illustrates accelerating from the state of Fig. 23, and feeding a slug of fuel by gravity through lifting of needle valve 218 upon opening the throttle, and except for the slug feeding of fuel for acceleration, this view is substantially like Fig. 23. It will be understood that the throttle positions are illustrative only and may vary from what is shown in these views.

Figure 25:
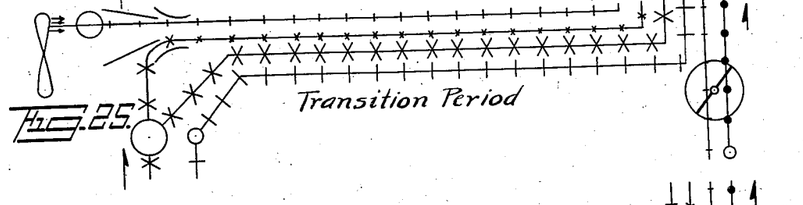

In Fig. 25, the transition period, the butterfly valve 88 has cut in, and the hot exhaust gas is cooled by cold air injected therewith. The hot air supply is closing off and the exhaust gas is supplied partly cooled by the cold air and partly hot exhaust gas supplied through the meter port 98'.

Figure 26:
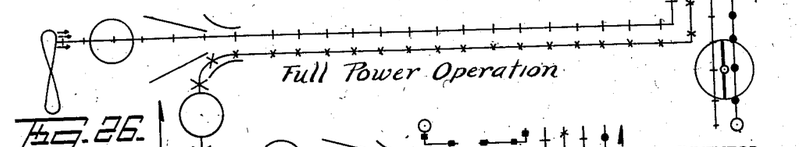

In Fig. 26, the full power state, all the exhaust gas admitted is taken through the injector 90 and is cooled by cold air injected thereby.

Figure 27:
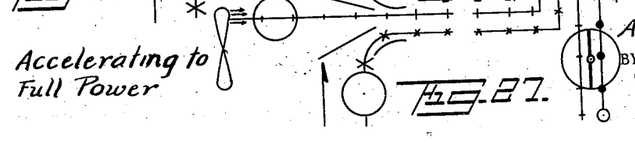

In Fig. 27, the situation is the same as in Fig. 26, except that when the throttle has been opened the valve 218 is raised, and fuel in the form of a slug or slugs is delivered for passing over the flat spot which would otherwise be encountered in accelerating.

The arrows on Figs. 19-27 serve to indicate the relative increase of exhaust gas pressure and kinetic energy and the decrease in intake vacuum or depression below atmospheric pressure which accompanying the increase in power development and opening up of the throttle.

This application is in part a continuation of my applications Serial No. 64,522, filed October 24, 1925 and Serial No. 85,450, filed February 2, 1926.

I claim:

1. An accessory combustion control device for attachment to internal combustion engines for consuming volatile liquid fuel, comprising means for by-passing exhaust gas from exhaust to intake, and means for supplying auxiliary fuel to the gases in the by-pass.

2. A source of hot air supply to the intake of an internal combustion engine, a source of exhaust gas supply thereto, and valve means for metering said gaseous materials together through a common passage at certain valve positions and separately through separated metering passages at other valve positions.

3. A by-pass for exhaust to intake of an internal combustion engine, a valve for controlling the exhaust gas passing through the by-pass and for controlling entrance of hot air to the by-pass, and a second valve for admitting cold air to the by-pass, said second valve having a lost motion connection to the first valve.

4. Eduction means for diverting a portion of the exhaust gases from the exhaust conduit of an internal combustion engine, comprising a partition member with a return passage around it, the portion of said partition first encountered by the exhaust gas being adjustable.

5. Eduction means for diverting a portion of the exhaust gas from the exhaust gas conduit of an internal combustion engine, comprising a butterfly valve, and a partition adapted to substantially line up with and form a continuation of said valve in a predetermined position of the butterfly valve.

6. In combustion control apparatus for internal combustion engines, means for by-passing exhaust gas from the exhaust to the intake of the internal combustion engine, a valve therein, an enlarged chamber into which the exhaust gas is delivered substantially directly from said valve and having a lateral constricted outlet, and an air supply conduit entering said chamber at the same side thereof relative to said outlet as the exhaust gas, extending through said chamber and having its outlet surrounded by the exhaust gas outlet.

7. In combustion control apparatus for internal combustion engines, an injector for injecting air by exhaust gas of the internal combustion engine into the engine intake, comprising valved exhaust gas and air conduits coming together at substantially a right angle, the exhaust gas conduit being enlarged beyond the valve and the air conduit extending through such enlargement.

8. In combustion control apparatus for internal combustion engines, an exhaust gas chamber, a lateral outlet therefrom, means for supplying exhaust gas to the chamber at substantially its periphery, and an air conduit entering said chamber at the same side thereof relative to said outlet as the exhaust gas, extending centrally through said chamber and joining up with the exhaust gas outlet.

9. In combustion control apparatus for internal combustion engines, an exhaust gas chamber, a substantially axial outlet for exhaust gas therefrom, means comprising a valve close up to said chamber for supplying exhaust gas through the chamber wall at substantially its periphery, and means for supplying air comprising a conduit extending substantially axially through the exhaust gas chamber and having a valve close up to the exhaust gas chamber, the air conduit having its outlet sleeved in the exhaust gas outlet.

10. In combustion control apparatus for internal combustion engines, a casing in two parts, one having a valve bore and a rotary valve therein and the other part being in communication with a passage provided in the first named part and controlled by the rotary valve, and an injector including an air nozzle in the first casing part.

11. A self-contained accessory combustion control device for application to an internal combustion engine, comprising a chambered casing containing passages for exhaust gas, for hot air and for cold air, valve means for controlling these several passages and having attached thereto and forming a continuation of the chamber passages an exhaust gas eduction means adapted to replace a portion of the exhaust conduit and a means for delivery of charge component material adapted to be inserted between the carburetor and the intake manifold of the internal combustion engine, and means for actuating said valve means adapted to be connected up with the throttle operating means of the internal combustion engine.

12. A combustion control apparatus adapted to be inserted as a self-contained accessory between the intake and the exhaust of an internal combustion engine and comprising rotary valve means for controlling passage of exhaust gas therethrough and admission of hot air in admixture with the exhaust gas and a separate cold air admission valve having lost motion connection with said rotary valve and adapted to be opened up after the rotary valve has been opened to a material extent.

13. A combustion control apparatus adapted to be arranged between the exhaust and intake of an internal combustion engine comprising the usual carburetor and throttle, and having means provided in the combustion control apparatus for supplying fuel for engine idling, the throttle being arranged to be closed during engine idling.

14. In combustion control apparatus disposed between the exhaust and intake of an internal combustion engine for consuming volatile liquid fuel and comprising the usual carburetor and throttle, means provided in the combustion control apparatus for supplying a continuous flow of fuel during periods of the greatest intake depression, and also adapted for supplying fuel in limited or slug quantities upon opening the throttle.

15. In a combustion control apparatus for internal combustion engines, a by-pass from exhaust to intake, valve means for controlling passage of exhaust gas through and air into the by-pass, and an adjustable air inlet bleed opening provided in the by-pass between the valve means and the engine intake, whereby the air supplied through the by-pass can be adjustably controlled independent of said valve means.

16. Apparatus for preparing idling charges for combustion in an internal combustion engine operating on liquid fuel and having a carburetor, a throttle, and intake and exhaust conduits, which comprises means for delivering liquid fuel, hot air and hot exhaust gas principally by intake suction to the intake conduit above the throttle when closed.

17. Apparatus according to claim 16 having in combination therewith means operative upon the first opening of the throttle after idling to cut down the quantity of hot air delivered when required by delivery of an extra lean mixture from the carburetor.

In testimony whereof, I have signed my name hereto.

ARLINGTON MOORE.